(12) United States Patent
Hamor et al.

(10) Patent No.: US 6,976,003 B1
(45) Date of Patent: Dec. 13, 2005

(54) ADVERTISING, COMPENSATION AND SERVICE HOST APPARATUS, METHOD AND SYSTEM

(75) Inventors: Alan B. Hamor, Pennington, NJ (US); Mike D. Helton, Las Vegas, NV (US)

(73) Assignee: WK Networks, Inc., Pennington, NJ (US)

( * ) Notice: Subject to any disclaimer, the term of this patent is extended or adjusted under 35 U.S.C. 154(b) by 555 days.

(21) Appl. No.: 09/598,458

(22) Filed: Jun. 22, 2000

(51) Int. Cl.[7] .......................... G06F 17/60; G06F 17/00
(52) U.S. Cl. ....................................................... 705/14
(58) Field of Search ............................................ 705/14

(56) References Cited

U.S. PATENT DOCUMENTS

| | | |
|---|---|---|
| 5,721,827 A | 2/1998 | Logan et al. |
| 5,855,008 A | 12/1998 | Goldhaber et al. |
| 5,933,811 A | 8/1999 | Angles et al. |
| 5,937,392 A | 8/1999 | Alberts |
| 5,948,061 A | 9/1999 | Merriman et al. |
| 5,974,398 A | 10/1999 | Hanson et al. |
| 5,991,735 A | 11/1999 | Gerace |
| 5,999,971 A | 12/1999 | Buckland |
| 6,006,197 A | 12/1999 | d'Eon et al. |
| 6,009,410 A | 12/1999 | LeMole et al. |
| 6,014,638 A | 1/2000 | Burge et al. |
| 6,026,368 A | 2/2000 | Brown et al. |
| 6,026,369 A | 2/2000 | Capek |
| 6,038,591 A | 3/2000 | Wolfe et al. |
| 6,044,403 A | 3/2000 | Gerszberg et al. |
| 6,049,821 A | 4/2000 | Theriault et al. |
| 6,055,573 A | 4/2000 | Gardenswartz et al. |
| 6,061,659 A | 5/2000 | Murray |
| 6,317,782 B1 * | 11/2001 | Himmel et al. ............. 709/218 |
| 6,327,619 B1 * | 12/2001 | Blumenau .................... 709/224 |
| 6,393,407 B1 * | 5/2002 | Middleton, III et al. ...... 705/14 |
| 6,401,075 B1 * | 6/2002 | Mason et al. ................. 705/14 |
| 6,418,470 B2 * | 7/2002 | Blumenau .................... 709/224 |
| 6,601,041 B1 * | 7/2003 | Brown et al. ................. 705/14 |
| 2001/0039515 A1 * | 11/2001 | Mayadas ...................... 705/14 |
| 2002/0019771 A1 * | 2/2002 | Shuster ........................ 705/14 |
| 2003/0110210 A1 * | 6/2003 | Nolan et al. ................. 709/203 |

OTHER PUBLICATIONS

Filippi, Diane, "Doubleclick Debuts New Tool for Testing Creative on the Web", PR Newswire, May 20, 1996, 2 pp.*
Toland, Patrick, "C/Net: The Computer Network Unveils Revolutionary Internet Advertising Tools That Allow Custom Banner A Delivery Based on Demographic Information", PR Newswire, Dec. 6, 1995, 3 pp.*

* cited by examiner

*Primary Examiner*—James W. Myhre
(74) *Attorney, Agent, or Firm*—Morgan & Finnegan LLP

(57) ABSTRACT

A system and method for providing advertising sponsorship for content providers is described. The sponsorship derives revenue from a pool of revenue that is collected from participating sponsors. A functional host system containing a sponsor is served to a client for the duration of the client session. The host system tracks client impressions associated with a content provider's content during client browsing. When all of the impressions are collected and attributed to the respective content providers, a compensation value is distributed to each content provider. The value is determined by dividing the revenue pool by the number of impressions attributed to the content provider. The functional host further provides a host redemption system that allows clients to further utilize the hosts in trades, swaps, or barters.

54 Claims, 10 Drawing Sheets

ADVERTISING, COMPENSATION AND SERVICE HOST APPARATUS, METHOD AND SYSTEM

FIELD OF THE INVENTION

The present invention relates to advertising on a computer network. More specifically, the invention relates to a host delivery system for providing advertising content, as well as session specific advertising, promotion, and sponsorship messages and services on the World Wide Web (WWW) through the use of a functional host. The invention further provides a method and system for distributing sponsorship revenue among network content providers.

BACKGROUND OF THE INVENTION

Advertising has quickly become a predominant aspect within computer networks (e.g., Intranets, the Internet) and the WWW. The nature of computer networks has created an environment where computer users (i.e. "clients") can readily access corporate, product, service, public relation and other types of marketing and/or promotional content. Conventionally known as "on-line" advertising, many advertisers have developed systems to allow clients to view and access advertisement material and similar posts on their home computers and web browsers.

Typically, delivery systems that bring advertisements on the Internet are referred to as "banners" on a web page. These banner ads can have text, as well as various still-image and/or animated graphics. The banners are often presented as a Hyper Text Markup Language (HTML) link, in order to direct clients to a specified page, or a location in an TCP/IP (Transmission Control Protocol/Internet Protocol) location. The banners can be embedded in, or otherwise accompany, a web page when it is displayed to the client.

Since a majority of advertisements on the WWW today are not dynamic, many of the advantages of on-line advertising are lost. Non-dynamic systems do not allow advertisements to be focused to particular types of clients with particular interests. Instead, banners are typically associated with one or more web pages that contain content that is previously known by the advertiser as being relevant to the subject matter of the advertisement. While advertisers may reach clients through individual web sites, it is very difficult for advertisers to focus their advertisements to virtual "communities" or grouped consumers.

Since computer network systems (i.e., the Internet, WWW) have such a vast potential for allowing advertisers to reach clients/consumers, attempts have been made to "personalize" advertisements in order to target banners to particular clients. Specifically, clients can "pre-register" for advertising services, where the client's specific interests are manually inserted into a user profile. Clients then can be assigned a member ID, which becomes the destination point for subsequent advertisements. Other techniques to target advertisements involve tracking client activity in relation to the advertisement, i.e., logging the number of times a client has accessed an advertisement.

Under the present advertising models and systems, there does not exist a way to efficiently link clients with content providers, while targeting advertisements to those clients. Furthermore, under existing models and systems, the compensation systems that are implemented do not work to provide readily accessible sources of revenue to content providers on the WWW.

Furthermore, the use of trusted agents, or "hosts", has been limited to date. While hosts have been used for purchasing/accounting and WWW navigation, they have not been utilized to efficiently deliver advertisements and information to clients accessing provider content. The existing hosts have also had minimal functionality incorporated in them as well. Current hosts do not incorporate themselves into an advertising and compensation model that provides universal functions for advertisement and information delivery. Furthermore, there is a need to integrate functions to a host that allow clients to integrate services like technical assistance and customer service into their browsing sessions.

SUMMARY OF THE INVENTION

The method, system, business method and computer article of manufacture disclosed herein overcomes the deficiencies of current advertising and compensation systems by providing a networked advertising system that pools advertising revenue, and distributes that revenue to content providers in accordance with an impression ratio. Instead of using an open content environment (i.e., the WWW), aspects of this invention relate to systems where one or more content providers are organized into "communities" through a global content center (GCC). At this content center, various content providers of all types submit their particular content to be accessed by various clients.

Each portion of content is labeled and categorized within the GCC. For example, if a provider wants to submit content on the GCC regarding computer repair, the content may be grouped under the general category of "Computers", and further appear under a sub-category of "Computers" labeled "Technical Support and Repair." The variations of such labeling and categorization is almost infinite. Thus, the particular manner in which the content is presented to the client through the browser is left up to the GCC administrator. Through such categorization and labeling, clients can readily access content that is of interest to them. But more importantly, the categorization allows GCC administrators and content providers to interact directly with advertisers and track which types of content (as opposed to advertisement) is being accessed by clients, and the frequency of such access.

In order to provide compensation to the content providers, a host advertising system is utilized alongside a compensation system. Together, both systems form a powerful and effective revenue distribution scheme that minimizes or eliminates client payment for content services. While one embodiment uses the host advertising system synergistically with the compensation system, it is understood that both the host and compensation systems may be utilized independently as well.

The revenue pool in the present invention is collected from various participating advertisers or other sources of revenue. Once the revenue pool is established, the amounts of revenue distributed to each content provider (CP) are predetermined by a set ratio. This ratio consists of the entire revenue pool divided by the total number of "impressions" counted for each or all of CP's content. The "impressions" include the client viewing of content, printing of content, storing content and/or transmitting the content to other locations. A larger impression count for a CP's content translates directly into a greater share of revenue for that CP.

The present invention further incorporates the use of functional advertising content (FAC), as well as a functional host to effectuate the advertising model. FAC can be defined as messages, promotions, coupons, discounts, hyperlinks, informative messages, software programs, browsers, media players and other applications. The functional host is a software program that allows a client to register various "impressions" regarding viewed content, browse content, and otherwise interact with the FAC being delivered to the client.

Under this system, former cost-inducing content (e.g., customer service, technical assistance/support) can become revenue-producing endeavors to owners of content, their distributors, or to other service providers. Furthermore, content that was formerly available only for a fee to clients may now be accessed for free (or at reduced cost), since the compensation system replaces the need to charge clients for the provided content. Finally, by using a functional host, clients are provided with a powerful tool to seek out desired FAC, and content related to that FAC. In turn, advertisers can directly target advertisements more effectively to the clients.

DETAILED DESCRIPTION OF THE INVENTION

Figure 1:
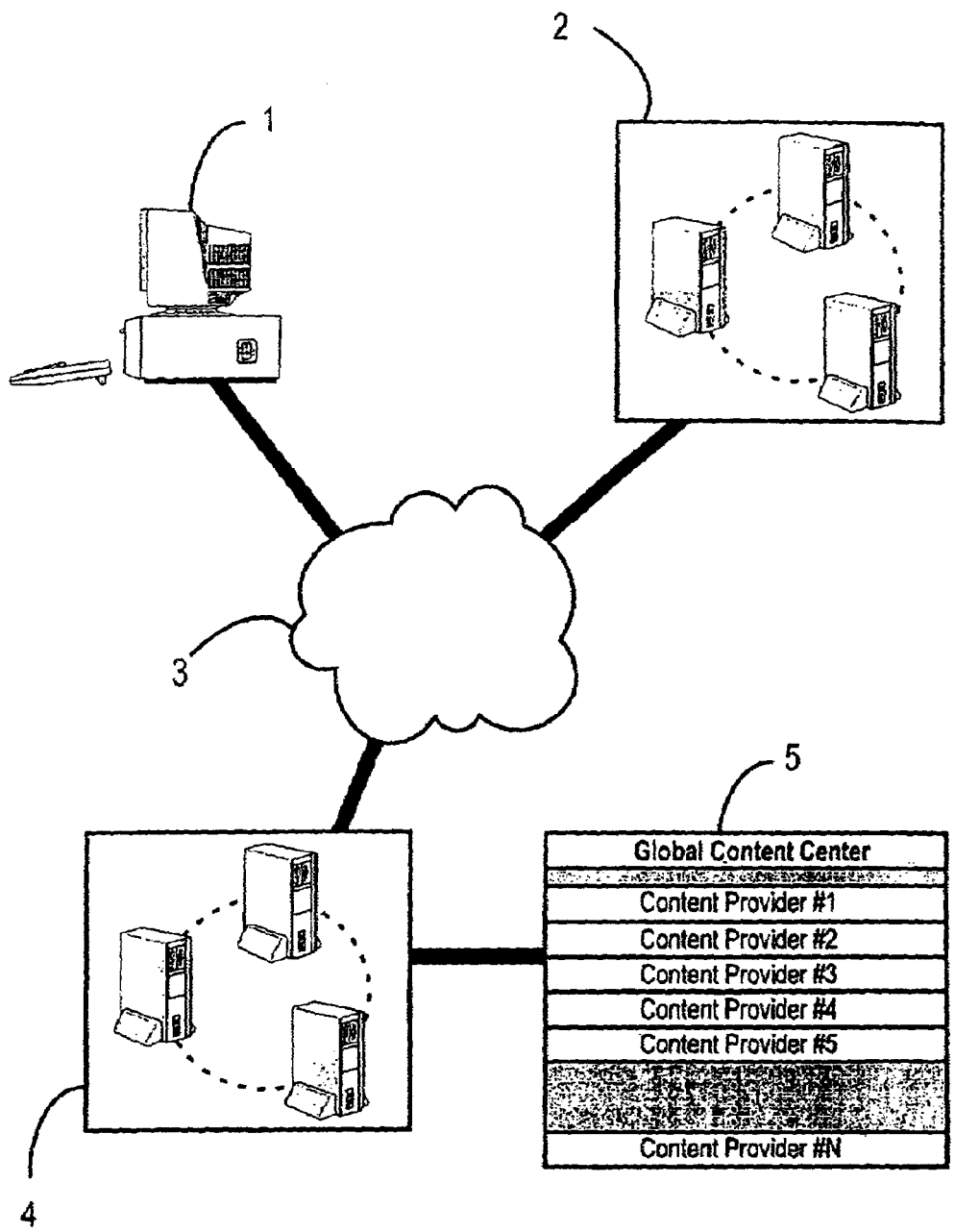
FIG. 1 illustrates the interaction of a client with the Global Content Center through a network connection.

FIG. 1 discloses an embodiment of the system through which a client 1 communicates through a network 3 to reach a Global Content Center (GCC) 5, that is housed in a content server site 4. An advertising server site 2 is also incorporated into the system. The content server site 4 and the advertising server site 2 may be housed either in a single server, or may be on multiple servers. In FIG. 1, the client 1 consists of a user-operable processor or computer, PDA, etc. that has some type of connection to a computer network. Preferably, the computer network supports Transmission Control Protocol/Internet Protocol (TCP/IP). The client 1 would also have means to connect to the network (modem, DSL, ISDN, etc.) as well as means to view and communicate with the content that is being provided. While only one client is shown in FIG. 1, it is understood that the same principles described below apply to multitudes of clients that are connected to the network 3.

The GCC 5 is a site that is established within the computer network 3, and is housed in the content server site 4. The GCC functions as a central location for one or more content providers, each of which register with the GCC 5 to provide content to clients. Each of the content providers are illustrated in FIG. 1 as having a finite content space within the GCC 5. The actual number of content providers may be set by the GCC administrator; any amount that is not limited by server or computer memory capabilities can be applied to this invention.

The advertising server site 2 functions to provide functional hosts and FAC to the GCC 5 and each content provider. While the hosts and FAC are preferably housed within site 2, these same functions may also be performed in one server, together with the GCC, provided sufficient memory and processing power is available. The host and FAC is incorporated with the content in the GCC to provide a functional host controlled FAC for each client 1.

Figure 2:
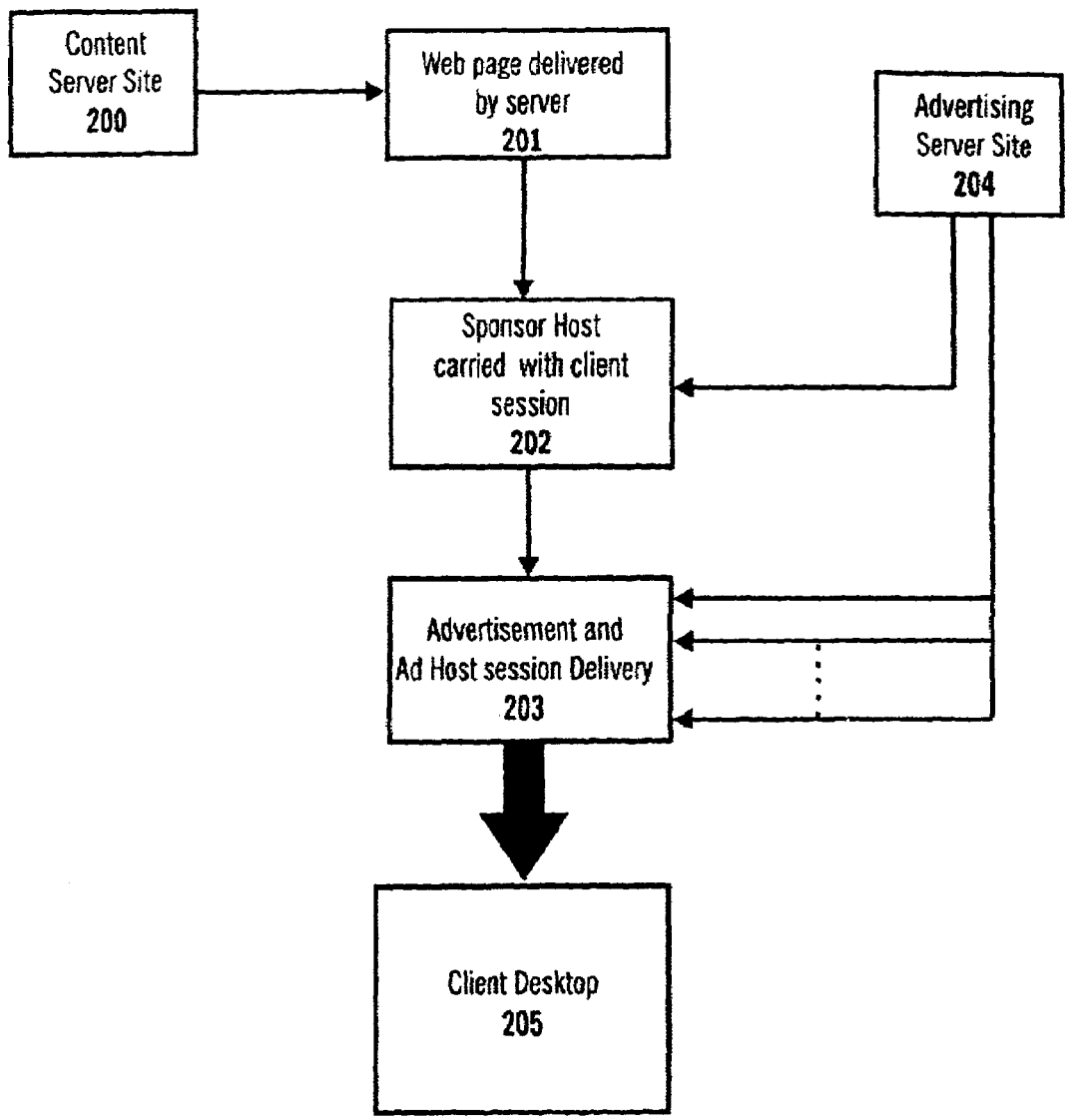
FIG. 2 illustrates one embodiment of the host and advertisement delivery system.

An illustration of how the host, advertisement and content are displayed on a client's screen is shown in FIG. 2. Here, the content server site 200 prepares a web page content for delivery 201 for a client's session on the client desktop 205. In FIG. 2, the functional host is carried with the client's session 202. The functionality of the functional host is described in further detail below (FIGS. 8–12). The Advertising server site 204 serves advertisement and the ad host session delivery 203 to the client session/desktop.

Figure 3:
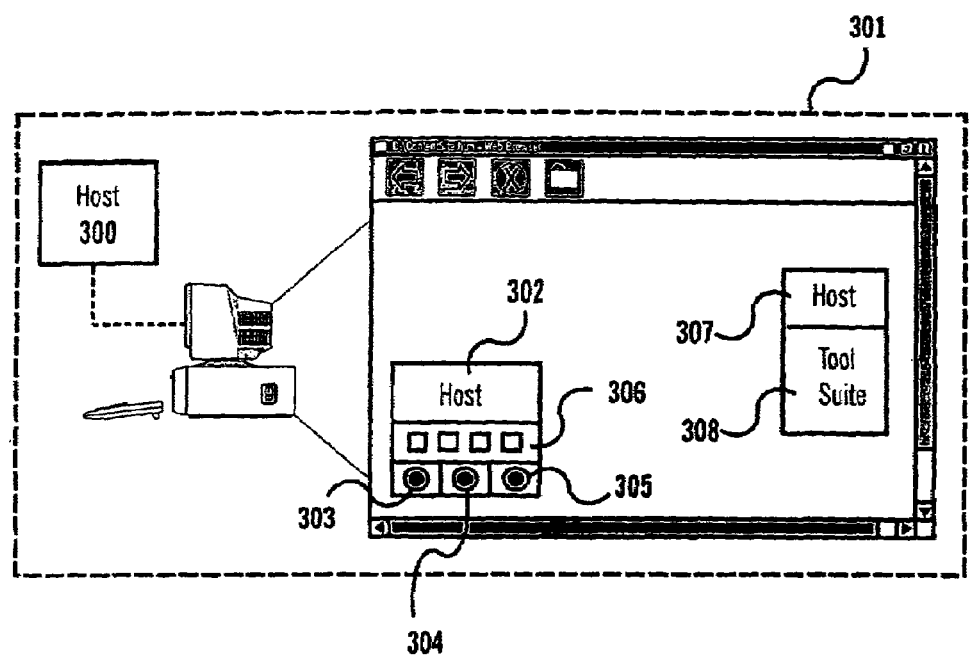
FIG. 3 illustrates the client desktop when interacting with the host advertising system.

The host 300 is software containing a functional logo, watermark, or some other identifiable device that appears within the content page displayed on the client's screen (FIG. 3, 301). The host may come in the form of a band, HTML insert or image tag, Java applet, or any other form that allows it to visibly and interactively accompany the web page. The host may physically appear as a single entity on the client's screen, the host may also appear as a multiple setting, wherein the auxiliary host 307 contains an additional tool suite 308 that allows clients to directly access advertising and/or sponsor-related content. It is understood that the tool suite 308 may be incorporated as part of the host 302 if desired.

The host 302 is "functional" in the sense that it provides personalized advertisement content control, as well as personalized browser control, and other functional features. The browser also serves to complement existing software in the computer system. The host even allows a sponsor's message to serve as the functional equivalent of a browser. The host is typically downloaded by the client, but may also be served to the client from a remote site. Clients can't normally access the host advertising system unless a functional host is served or downloaded to the client.

The host 300 is also "functional" in the sense that it serves as a conduit for a sponsor host and/or an ad host, as well as client-specific advertising (FAC) and promotional content. For example, a client may register with a GCC prior to browsing content, and specify areas of advertising or promotion that are of interest (e.g., laptop computers, dating services, local community activities, etc.). Once registered, the preferences are carried in, by, or through the host, and the host then discriminates through advertising and promotional content that will be received. The host is further coded to identify the client that it is associated with, or alternately contain tags that allow content sites to query the host and determine a profile for the client visiting their site. Since the host contains a personalized identity that follows the client (the host attaches, is carried with, or may even replace the browser), as well as containing data regarding the content that has been visited, targeted advertisements or promotions may be transmitted to the page with maximum effect. Additionally, the host may incorporate advertiser and/or sponsor related communication functions to allow clients to directly communicate back to the advertiser or sponsor(s) serving advertising-related content. This would allow clients to immediately query an advertiser or sponsor on matters such as technical support, sales support etc. related to information served to the host.

An important aspect of this invention is that the advertising related content is gathered and distributed in accordance with a functional host. As a result, the host 300 becomes a way to communicate a variety of advertising or promotional material to a client, without forcing the client to act affirmatively in order to activate the FAC. The host 300 may be further embedded with algorithmic content to provide interactive communication with the client by displaying active virtual buttons (see below) that the client may activate. Alternately, the host 300 may be configured so that it works as an interrogator, by querying portions of the FAC that conforms to the client profile. The host 300 could also serve as a reporter, by transmitting IP addresses of content that the client is accessing, in order to track the content being accessed by the client. Functions, algorithms, links, interrogators and other software may be served to the content page, where they can activate or empower the host functions, or may be clicked upon to activate the functions.

The virtual buttons 303–305 allow the client to print, transmit or save the content that is being viewed. These buttons serve to log client "impressions" of content on the GCC. These impressions can then be collected and processed in order to determine the revenues that will be distributed to GCC content providers. Each time a client views a particular content on the GCC during a session, the client (via the host) logs one impression in relation to that content. If the client views the content and then saves, prints, or e-mails that content to a friend, one impression will be logged for that content provider for each of those actions.

Other buttons 306 may be incorporated into the host to provide navigational or other functional features. The buttons 306 may be navigational buttons that allow browsing for the client (independent from the browser), and may also incorporate different client-driven menus (e.g., client preferences, host collection, etc.). The buttons 306 can also function to search the WWW, as well as create, modify and use search interfaces, and depict client and host networking whereabouts as a graphic display. The buttons 306 may also function as links to sponsors or advertisers or other service providers.

Client association routines or subroutines may be coded, embedded or associated with the host, so that clients may retain more information that stems out of prior client browsing experiences. The host is also enabled to recognize familiar clients, or serve as the client itself (i.e., appear on the client desktop). The host also may be configured to launch software applications or dialog boxes, and even perform searching functions through the TCP/IP network. The software or other files existing in the content may further be associated with the virtual buttons, so that a "save" command initiated by a client may further download images or software associated with the content. It should be noted that while the virtual buttons are disclosed as being part of the host, it is understood that the buttons may appear anywhere within the content space, and may be configured to perform identical functions. A more detailed description of the host functions is shown in FIGS. 6–10, as well as the associated text.

Figure 4:
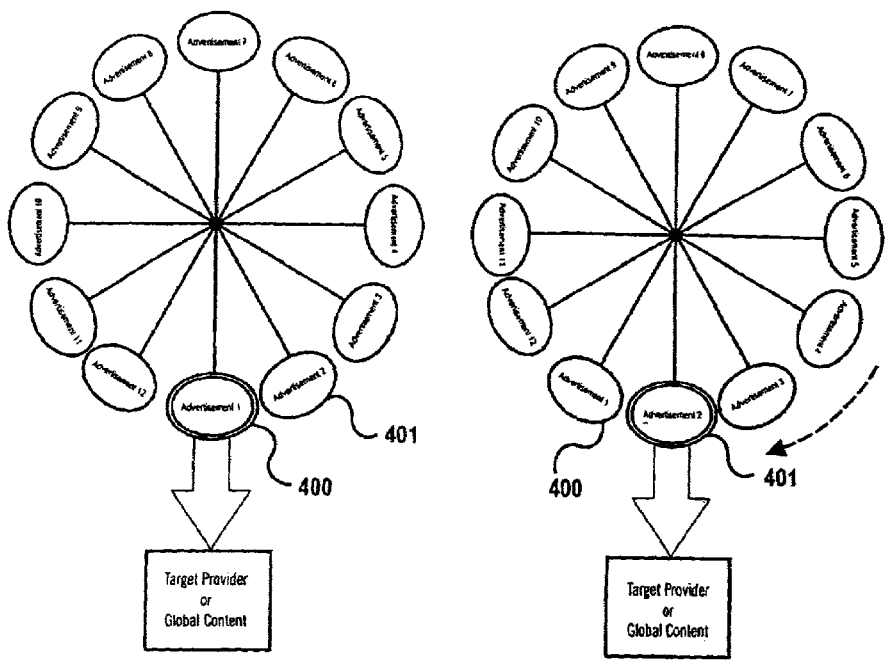
FIG. 4 illustrates the an advertising wheel and its delivery of advertisements.
Figure 5:
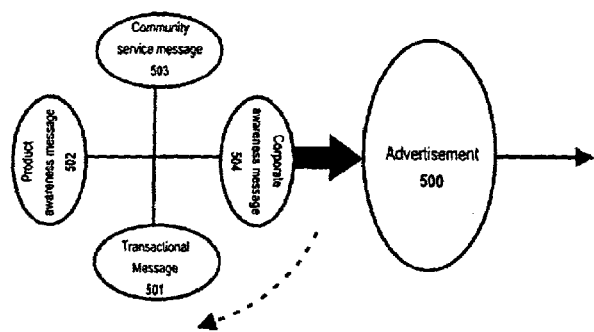
FIG. 5 illustrates an advertising wheel subset in accordance with one embodiment of the invention.
Figure 6:
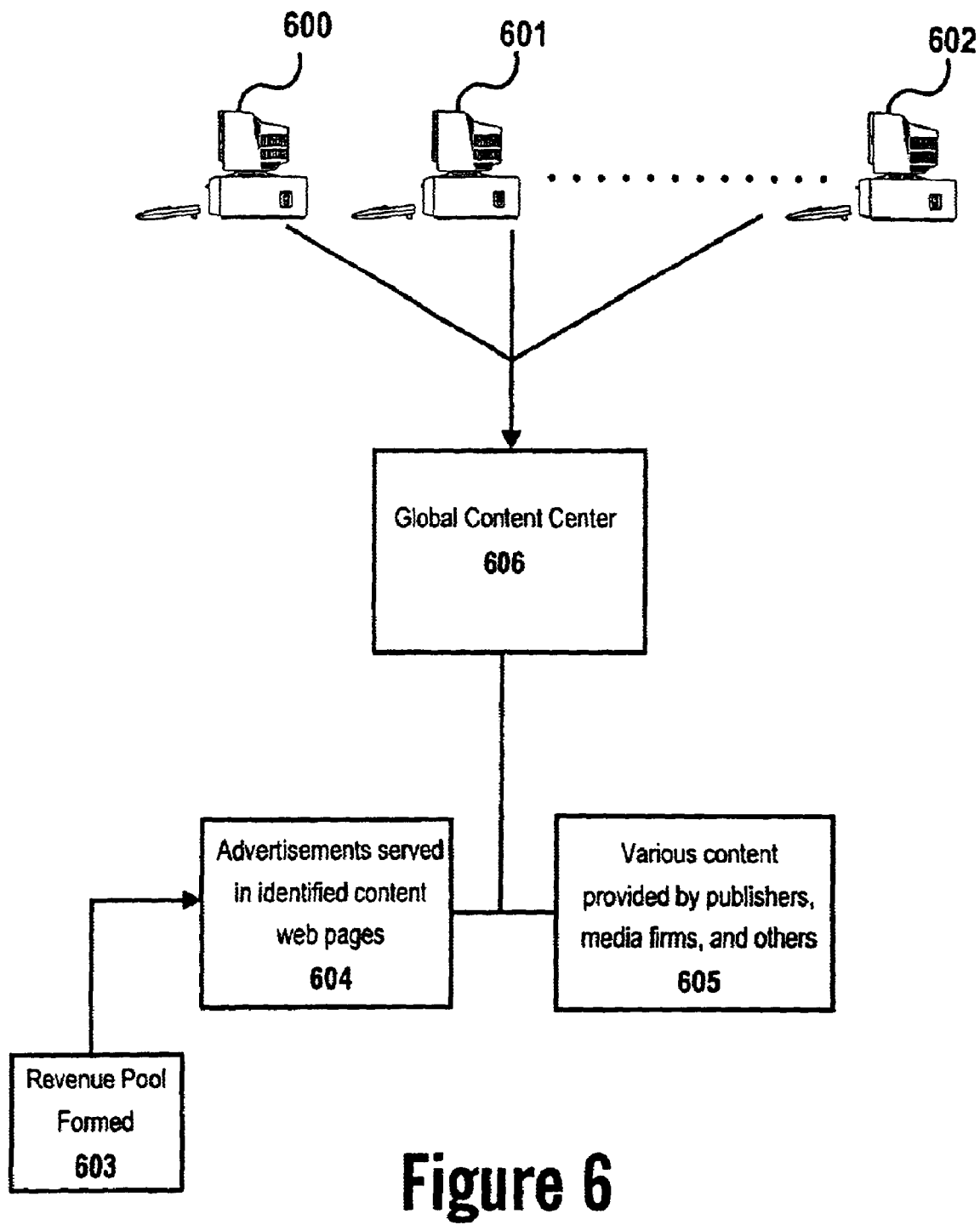
FIG. 6 illustrates a high level diagram of the system's interaction with the revenue pool.

An example of the method through which advertisements are delivered to the content sites (and/or host), is illustrated in FIGS. 4–6. The advertisements are configured much like a wheel, where each "spoke" is associated with an advertisement or promotion. In the illustration shown in FIG. 4, a series of twelve advertisements or promotions are shown (labeled as "Advertisement 1" through "Advertisement 12"). Of course, any finite number of advertisements or promotions can be used. These advertisements or promotions may all be from one advertiser or promoter, or may each be from different advertisers or promoters, or a combination. After the client has initiated a session, the advertising server locks in the first advertisement 400 to be delivered to the host, target provider, or GCC (FIG. 4).

As the client progresses to the next content site or content page, the advertising wheel responds by rotating to the next advertisement or promotion 401, and launching that advertisement. With each progression, the wheel rotates to the next advertisement or promotion, and sends it to the client-host, target provider or GCC. The final location of the advertisements may be significant, since content-specific advertisements or promotions may be pooled into their own "wheels" and associated with certain content sites. For example, content categorized as "computer hardware" on a GCC can have advertisements or promotions that are limited only to computer hardware (e.g., scanners, monitors, peripherals, etc.), so that relevant material may be displayed within the appropriate content.

It is understood that in accordance with this invention, numerous methodologies may be used to link the wheels. While the above example pooled advertisements and promotions according to subject matter, the wheels may be pooled for a multitude of manners including, as an example:
1) localities of advertising companies;
2) companies running specials on a product or service;
3) prices of products or services (e.g., products costing under $100);
4) newly released products or services;
5) companies sponsoring community or charity events;
6) companies sponsoring community or charity events in a specific locality;
7) financially-related news concerning companies in a particular sector or group.

The flexibility of the system allows for a wide variety of groupings that can be chosen from. One way in which advertising administrators can expand the options for advertising or promotional delivery is shown in FIG. 5. Advertisement 500 appears as one of the advertisements or promotions that is queued up in the advertising wheel shown in FIG. 4. Advertisement 500 can appear as a product, corporation, event, etc. For example, if advertisement 500 is associated with a corporation, the advertising administrator may create wheel attachments to the "hub" advertisement to create flexible sub-categories of advertisements or promotions. In FIG. 5, an example is shown where four sub-categories 501–504 are created for one advertisement 500.

Assuming that advertisement 500 is associated with a corporation, the corporation may wish to segregate advertisements according to their content, and transmit particular types of advertisements to particular clients or content sites. Thus, under the example, a group of transactional messages 501 may be queued, which transmit advertisements related to product sales, closeouts, specials, etc. related to products or services that are being sold. Also available are product awareness messages 502, which can relate to information or advertising related to new product releases, upgrades, general product awareness information, or even promotional contests. Next would be community service messages 503, where the corporation could give information on activities or community service (e.g. "5K run to wipe out cancer"). Also available would be corporate awareness messages 504, which would transmit information on financial matters or other information regarding the daily business activities of the corporation.

The sub-categories are arranged as "wheels" to the advertisement hub 500. The sub-categories can be configured to "rotate" between messages (FIG. 5), and further rotate with the advertisement 500 that it is associated with. Alternately, the sub category "wheel" can be designed to be stationary, while different advertisement hubs rotate through.

It is understood that while the advertising model is described in the form of a wheel, that other models may accomplish identical or equivalent functions. The term "wheel" is used only to conceptualize the functionality of the invention and its lesser parts. Thus the advertising model may be executed through shift registers or queues, or could also be performed via databases and/or servers.

A high-level view of the advertising model, working in conjunction with the compensation system is shown in FIG. 6. Here, all of the revenue collected by the advertising administrator is stored in revenue pool 603. This revenue is taken from advertisers who wish to target clients accessing the GCC 606. The client computers are shown as 600–602. The interaction between the clients, advertisers, and the GCC functions according to the same principles described above. The GCC 606 is the central point to which various content providers post their content. The source of the various content is shown as 605. The content providers can consist of publishers, media firms, vendors, service providers, etc.

As content is being transmitted to the GCC 606, advertisements are also being served 604 for targeted content in those web pages. The content and the web pages are ultimately served to the GCC 606, where they are presented to the clients 600–602. The revenue pool formed in 603 from the advertisements 604 is available to pay content providers posting on the GCC 606. The amount of revenue paid to a content provider will be determined through an algorithmic ratio, that determines client migration related to activities within accessed content.

Figure 7:
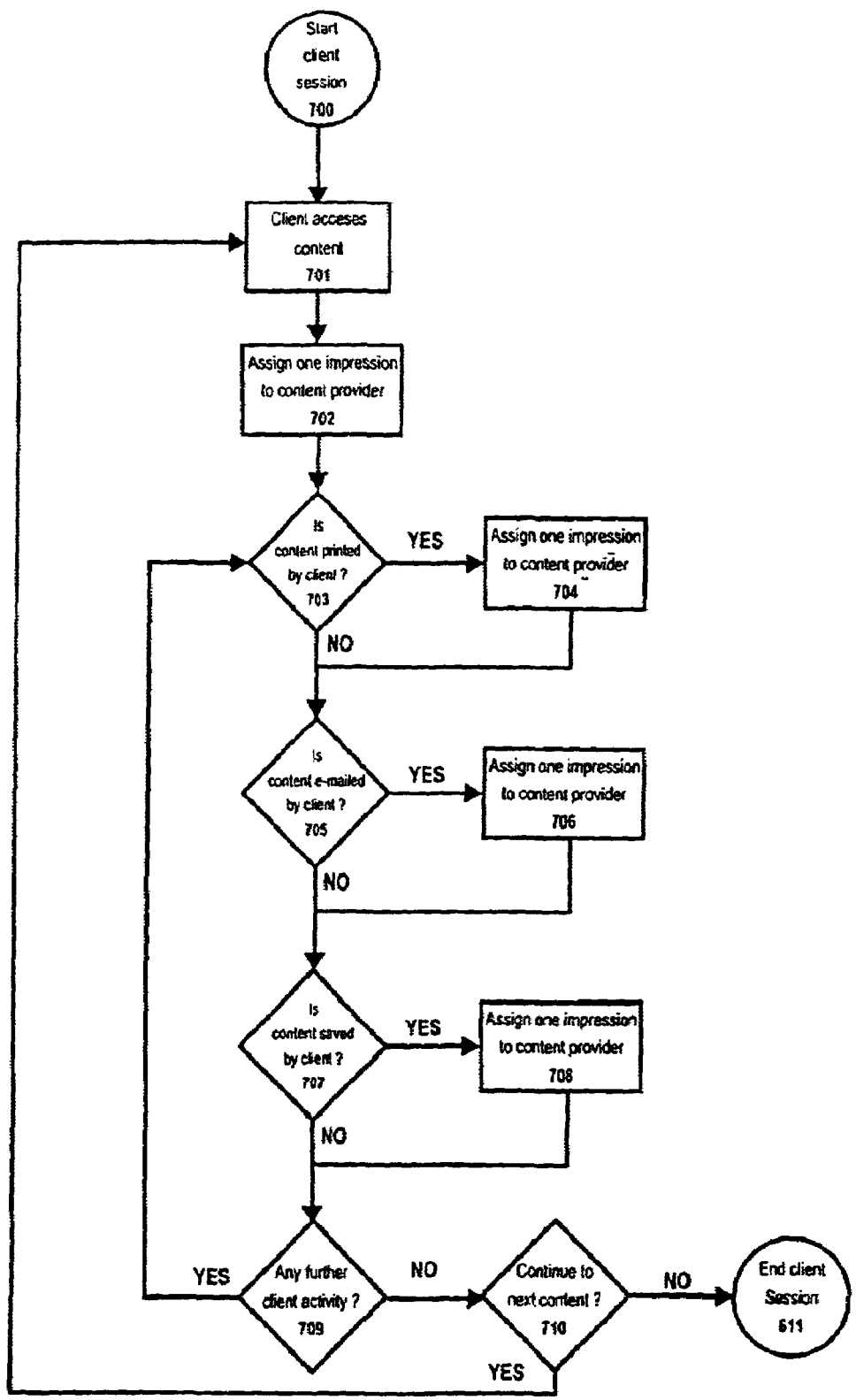
FIG. 7 illustrates a process through which client activities correlate to content provider impressions.

An example of how client activity is monitored for the purpose of revenue distribution is shown in FIG. 7. Each time a client accesses a GCC, the client can choose to begin a session 700 on the GCC. Once the client is logged in, the client may choose to access content on the GCC 701. Once the content is accessed, the content provider transmits content, such as a web page, to the client. During this time, the client will have either viewed or heard, or otherwise had an "impression" of the content. Thus one impression is credited to that content provider 702. Once the client makes a further determination regarding the relevancy of the content, the client may wish to interact with the content. If the client determines that the content is worthy of printing, the client may instruct the host or content to perform a print function 703. If the content is printed out, the content provider is credited with a second impression 704. If the client chooses not to print, but instead e-mails the content 705, the content provider is again credited with a single impression 706. If the client saves the content 707 onto a storage medium, the content provider is credited with an impression as well 708. It is understood that any numerical value, whole or fractional, may be assigned to client activities (e.g., saving, e-mailing, printing, searching) that are related to specific content.

Thus if the client views the content, prints, e-mails and saves the content as well, the content provider would be credited with a total of four impressions for that particular content. If the client only viewed and printed the content, the content provider would only be credited with two impressions. The system checks for further client activity 709 while the client is in the content. Once the client decides to exit one content, and continue to the next 710, the system restarts itself, and begins a new count for the new content. It is understood that if the client accesses different content from the same content provider, the new content may be counted anew under a different category for the same provider. Alternately, the provider and/or the advertising administrator may choose to continue counting impressions regardless of the content that is being accessed for that provider or by that client. The options are limited only by the needs of the content providers and the advertising administrators. When the client chooses to exit the content and/or the GCC, the client session is terminated 711.

The advertising and compensation system has a finite number of ad spots generating a finite revenue pool through the sale of those spots to various advertisers for a finite period of time. The amounts of revenue generated towards the content providers is calculated through the following equations:

$$\text{Revenue Pool} = \text{\# of ad spots} \times \text{price per ad}$$

and $$\text{Content Provider Revenue} = \frac{\text{Revenue Pool}}{\text{\# of client impressions}}$$

For example, an advertising administrator might charge $10,000 per spot for a one month period to advertisers wishing to advertise in a GCC or GCC content. Supposing that 200 ad spots are purchased by various advertisers, the total revenue pool would amount to $2 million dollars (200 times 10,000). This amount would then be available for distribution to the content providers. At the end of the one month period, the number of impressions that have been tallied for each of the content providers are then used to determine the revenue that gets sent to each particular provider.

Assuming a GCC obtains 5,000 impressions under the aforementioned revenue pool, each of those impressions would translate into $400 per impression (5,000 impressions times $400 equals $2 million). And assuming that those impressions were distributed among three content providers A, B and C, where each provider tallied 500, 1500 and 3000 impressions respectively, all three providers would obtain compensation for providing content. To determine the actual dollar numbers distributed, the following calculation is performed $$\text{Provider A: 500 impressions} \times \$400 = \$200,000$$

$$\text{Provider B: 1500 impressions} \times \$400 = \$600,000$$

$$\text{Provider C: 3000 impressions} \times \$400 = \$1,200,000$$

Thus each of the content providers would obtain revenue for distributing their content in accordance with client activity and migration toward their content. Under this invention, fee-for-service sites like expert sites and technical support sites can be offered for free, or at reduced cost to clients. And since the content providers may be linked together to a GCC, it is easier for clients to navigate through relevant content. Furthermore, the GCC environment helps advertisers achieve a greater focus on their advertisements and promotions to clients/consumers that would be predisposed to view their ads.

Figure 8:
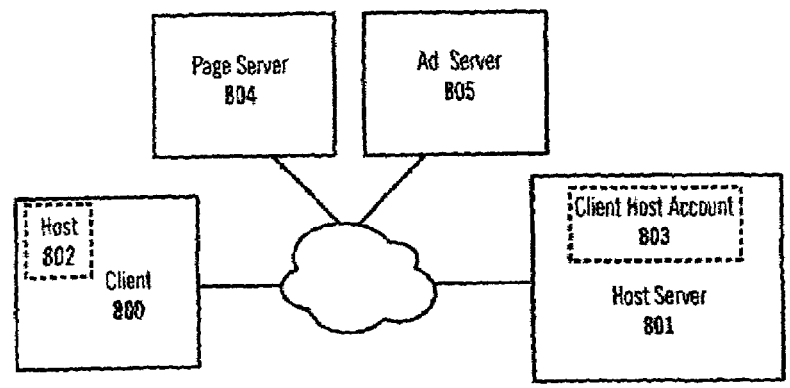
FIG. 8 illustrates a high level diagram of the host and ad server.

FIG. 8 illustrates an embodiment of the present invention, where a client 800 interacts with the system through a functional host 802. While FIG. 8 shows a host 802 housed inside the client 800, the client 800 may obtain a host 802 in various ways. One way a client obtains a host is by downloading software (i.e., a band, plug-in, etc.), or otherwise associating the software to the browser (this is referred to as a "sponsor host"). Typically, the sponsor host contains various browser functions as well as other functions and tools. The software is typically made available for download by third parties (e.g., IBM, Yahoo!™, McGraw-Hill, Microsoft, etc.) as an inducement to access their specific content. Once downloaded, the sponsor host gets loaded up each time the client logs in, and remains in the client's browser for the duration of the session (as long as other hosts are not being served to and accepted by the client, or otherwise deactivating the host).

Aside from obtaining a host, the client also registers with the GCC by creating an account 803 where client profiles and preferences may be entered. The host server 801 can provide a central portal through which numerous sponsor hosts deliver their affiliated software. It is understood that the host server 801 and client host account 803 may be housed in a single network site, or be distributed among multiple sites. Among other things, the registration allows clients to access the advertising and promotional features of the present invention.

The page server 804 and the ad server 805 are also connected to the network. The page server 804 functions to serve content pages to the client, along with a host served from host server 801, while the ad server 805 delivers FAC. Typically, the page server 804 communicates to the host 802, and subsequently to the client 800. However, the system may also be configured so the host 802 communicates to the page 804 and then to the client 800. It is understood that the term "server" (e.g., host server, page server, ad server) is used to differentiate between the various algorithmic functions performed in the described system. While each function may reside in different physical areas (i.e., computer servers), they may be combined and separated in any manner deemed appropriate by the system designer. All of the functions may reside in one or more physical computer servers, depending on the processing speed and memory available at the time the system is implemented.

Figure 9:
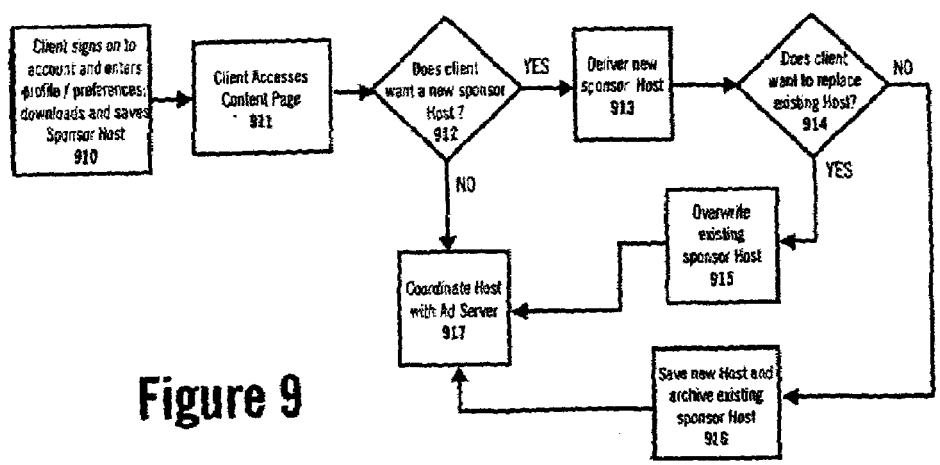
FIG. 9 illustrates the effects of a sponsor host on a client's session.

An example of the interaction of the sponsor host with the system is shown in FIG. 9. Before accessing a content page, the client first registers with the service and typically creates an account with a client profile and preferences, and subsequently downloads a sponsor host 910. The client is then ready to begin a session. Once the client accesses a content page 911, the sponsor host will visibly appear in the client's window, and will remain visible in some form throughout the entire session. An example of this can be seen in FIG. 3. The sponsor host will also contain a visible "skin" that identifies the sponsor host with the company or organization responsible for making the sponsor host available to the client. If a client accesses a content page 911 that happens to be affiliated with another sponsor, the client can be queried to accept the new sponsor's host 912. If the client declines to download a new sponsor host, the session continues with the existing sponsor host (along with any functions present in the existing sponsor host). Accordingly, the data contained in the sponsor host is coordinated with the ad server 917. However, if the client chooses to accept the new sponsor host, the new sponsor host is delivered to the client 913 from the new sponsor. The client may then download the new sponsor host, wherein the sponsor host changes to incorporate the look and functional features that the new sponsor has contained in that sponsor host. The client may be further queried on whether the new sponsor host is to replace the existing sponsor host, or merely supplement the existing sponsor host 914. If the client decides to replace the existing sponsor host, then the new sponsor host is written over the existing sponsor host 915. Thus, the existing sponsor host is deleted from the client's desktop after replacement. After replacement, the system then moves to 917. If the client decides that the new sponsor host should exist as a supplement to the original sponsor host, then the new sponsor host is saved, and the existing sponsor host is archived 916 in the client's computer. The client may go back at a later time and re-designate any sponsor host to be the active sponsor host. After the new sponsor host is installed, the system moves to 917.

Figure 10:
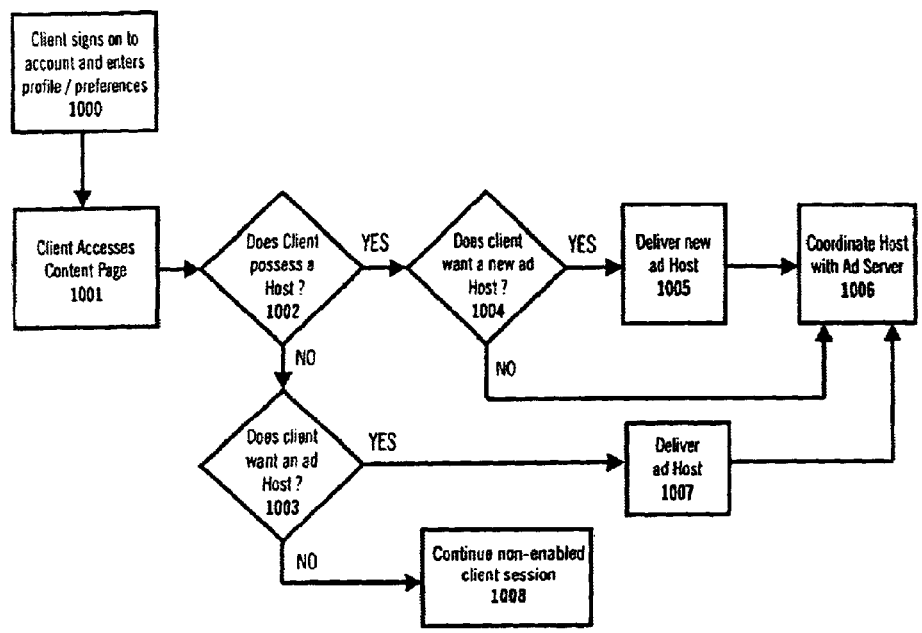
FIG. 10 illustrates the effects of an ad host on a client's session.

FIG. 10 discloses an additional host delivery scheme, referred to as an "ad host". Here, the client registers with the service and enters a client profile and preference 1000. However, here the client does not commit the host to permanent memory inside the client's system. When the client accesses a content page 1001, the system analyzes the client to see if there is a functional host (of any type) residing with the client's session 1002. Of course, the first time a client accesses the system, there will be no host present. Thus the client is queried to determine whether he or she wants to accept an ad host 1003. If the client refuses, then the client will continue the session in a non-enabled manner 1008. In this case, the client would browse through content without having access to the advertising distribution model (i.e., a random advertising wheel is utilized; see FIGS. 11–12).

If the client chooses to accept the ad host in 1003, the ad host is then served to the client through a TCP/IP environment 1007. After delivery, the host is configured with the ad server 1006 to determine the type of FAC that will subsequently be served. In 1002, the client may already possess a host that was carried through a previous content page. If the host is still present, the client may be queried to see if a new ad host is desired 1004. If the client does not accept the new ad host, the system proceeds to 1006. However, if a new ad host is desired, it is then delivered through a TCP/IP environment 1005, wherein the system then moves to 1006. The principles described in the ad host apply as well for an existing sponsor host as well. If a client has a sponsor host, the ad host can be served in addition to the sponsor host. The ad host will then apply a new "skin" to the sponsor host if the ad host is accepted.

The ad host is different from the sponsor host in that the ad host is retained only for the duration of the client's session. Furthermore, when a client who does not have a sponsor host accesses an ad host partner or customer content site, accepting the associated ad host gives the client (and the registered client account) access to the ad host system. The ad host functions may differ in that additional hyperlinks, communication, recognition abilities, and even software may exist in the new ad host, but the overall effect to the client is more visual than functionally robust. While sponsor hosts and ad hosts have been described above, it is understood that this invention also contemplates other hosts, such as those pertaining to customer service, sales, technical support, and other services.

Figure 11:
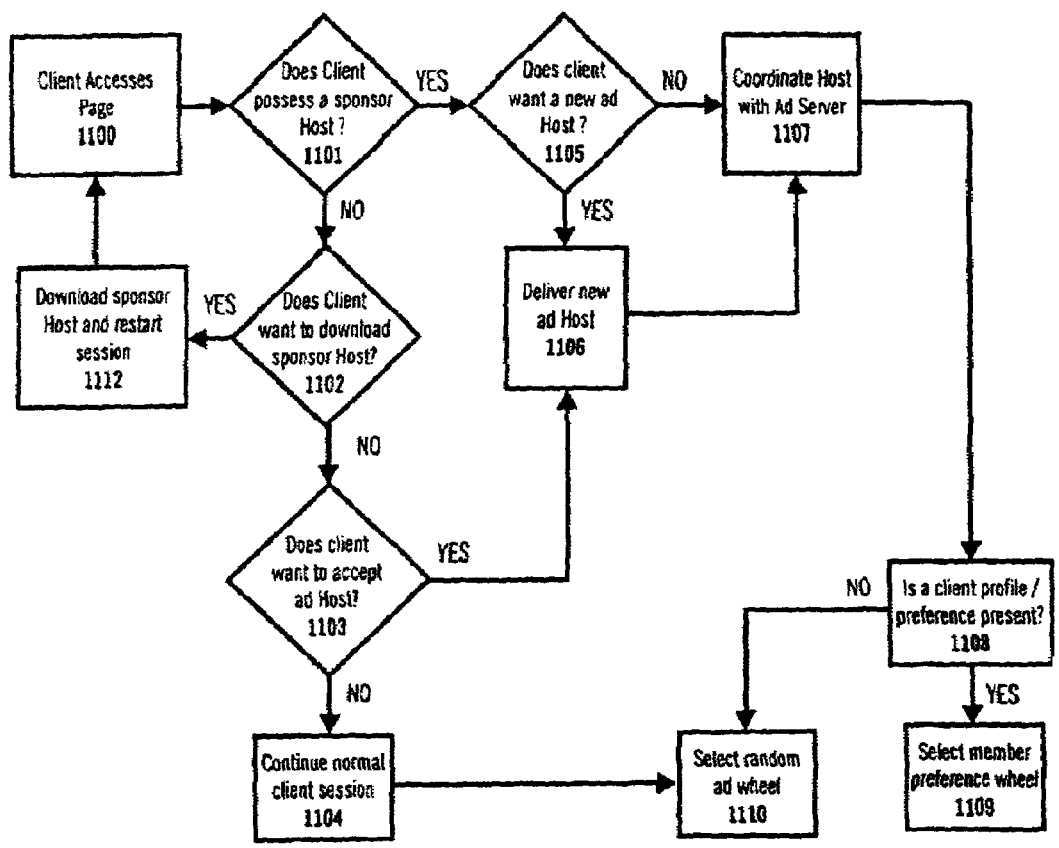
FIG. 11 illustrates the interaction of the host system and advertisement wheel during a client session

FIG. 11 discloses an embodiment of the invention illustrating the effect of the hosts on the FAC delivery. As a registered client accesses the content page 1100, the system determines whether or not the client possesses a sponsor host 1101. If no sponsor host is detected, the client will be given an option to download a sponsor host 1102. If the client accepts, the sponsor host is downloaded 1112, the client configures the host with the service, and the session is restarted. If the client declines to download a sponsor host, the client is then given the option to accept an ad host 1103 that will be enabled for the client session. If the client declines an ad host, the system allows the client to continue a normal (i.e., non-enabled) session 1104, where a random ad wheel will be chosen to deliver advertising content 1110. If the client decides to accept the ad host 1103, the ad host is served to the client 1106, and the host is then coordinated with the ad server 1107.

While client registration is necessary to fully access the system, the client may not wish to fill in any of the profile and preference data. If the client leaves this information blank, the system in 1108 will detect this, and accordingly assign a random ad wheel for the client session 1110. However, if the system 1108 detects profile and/or preference data associated with the client, the system accesses the information and accordingly configures a member preference wheel 1109 for the client session (see FIGS. 4–5B). It is understood that the advertising wheel may consist of a single wheel, or may further contain additional wheels or layered wheels.

The client profile and preference account may be housed in an account server that is associated with the host server, or may appear in the host server itself (see FIG. 8, 803). The account server typically implements three types of functions for the host server: (1) profile data, (2) account status, and (3) host functions. The profile data will typically contain account preferences, ad category selections, message type selections, as well as ads that may be served when content is linked to a specified ad category. The profile data further contains information regarding the orientation of the client account, the type of advertisements that the client wishes to see, the messages that the client will receive in conjunction with the advertisements and types designated by the client. The account status will consist of records indicating the number of hosts that a client has collected or accessed, as well as any special promotions or other information that are open to the account.

The host is linked with the client host account server (see FIG. 8), where the account status and host functions (described above) determine the status of the client in relation to the FAC. For example, if Company X was promoting a particular product that was appropriate for the client's profile data, the FAC and/or the client's host would flash, or otherwise signal the client of the promotion or advertisement. Once the client activates the host, the client would be taken to 104, where the account status would report the collected host, and possibly give additional information on the promotion (e.g., "you have collected 4 hosts—collect the last 3 soon, because the promotion ends in 15 days!"). While the client is using an activated host, the host functions determine the program calls and may further activate the host menu by expounding on already-selected features, or providing new features for the client to choose from in accordance with the host.

Once data received from client activity is processed, the host server, or any other server, may apply that data to the compensation wheel to determine the distribution of revenue, discussed above. The host server (see FIG. 8) also uses client profile data to determine the types of wheels that are to be used in the distribution of advertisements and information. If the client has a profile that specifies at least one preference for a type of ad category, and the client is engaging the host in that capacity, the host delivers advertisements and/or information that is affiliated with the member preference wheel. The member preference wheel would contain only the FAC that the client has specified. The account preferences would typically be grouped into ad categories, message types and "links" between ads and related content. Conversely, if the client has no profile on record, or has not specified at least one preference or limitation to the FAC, the host server would simply utilize a random wheel (see FIG. 11), which would typically contain whatever advertisers that were available to that wheel at the time. In any event, once the type of wheel is chosen, the host and ad server controller organizes the ads and information coming from the wheel(s) and presents it through the host to the client during the client's session.

Figure 12:
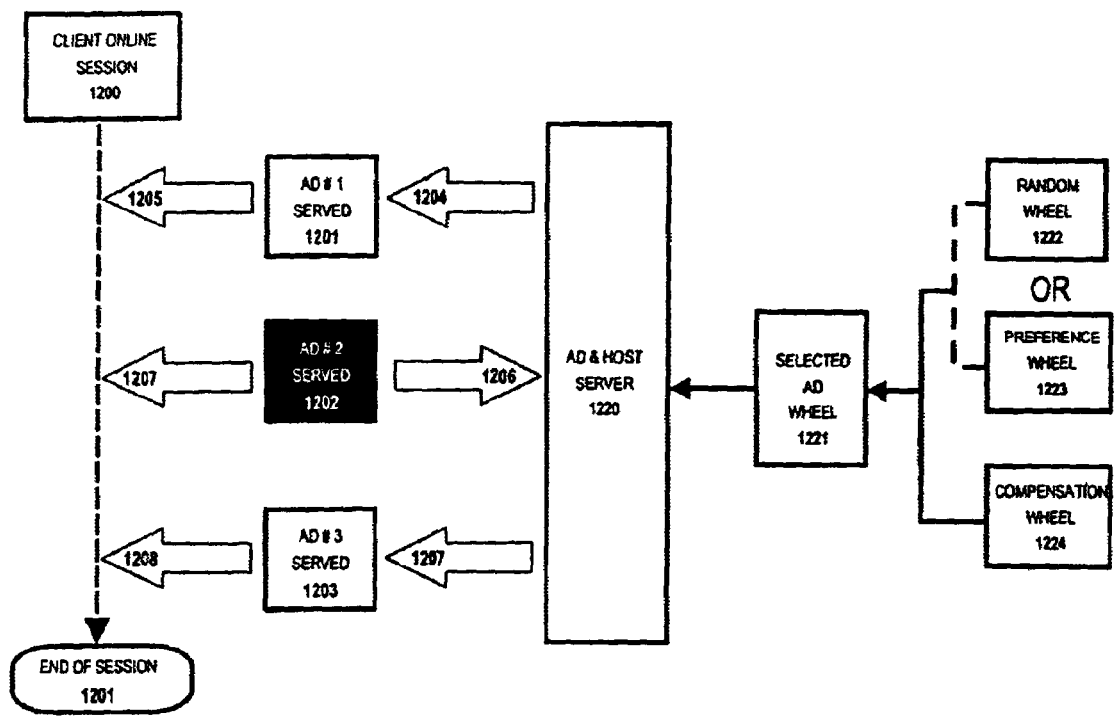
FIG. 12 illustrates the delivery of ads during a client session.

FIG. 12 discloses an embodiment of the ad host, and the transmission of the functional host to the client. In FIG. 12, a client's online session begins at 1200, and progresses sequentially in time until the end of a client session is reached in 1201. In the example shown the client is served three ads in response to the functional host during the session.

Depending on whether the client profile is active or not, the random wheel 1222 or preference wheel 1223, along with the compensation wheel 1224, will be the source of delivering advertisements through the functional host. When the particular wheel is chosen 1221, the ad is processed through the ad & host server 1220. In FIG. 12, the first ad is transmitted 1204 from the ad & host server 1220 to the functional host 1201 and then further to the client 1205. In the example, the first ad 1201 is a straightforward ad, without any further promotion of information.

Next, the second ad 1202 is served, except that in the example, the existing functional host is given a new host skin (designated by the reverse background/text in the example), signifying to the client that additional promotional or informational material is available. The type of skin may vary (e.g., change colors, flash, etc.), and the choice of skins may be configured by the system designer. The skin may also contain, link to, or otherwise highlight or indicate places where additional information (e.g. "Company X has products 50% off"; or "collect 10 different Company X hosts in the next month and get a free widget") can be found or that additional client action is requested 1207. If the client chooses to activate the functional host 1206, the client is taken back 1220 to inquire further about the promotions and/or information. The functional host may be further embedded with new functions in addition to the functions carried by the client at that time. So, for example, if multiple advertisement decisions exist as to one or more products, these decision choices may be additionally nested into the functional host served to the client.

Once the client completes the inquiry concerning the second ad 1202, the client may wish to continue on the session. If the client decides to change content during the session, and the ad & host server 1220 is instructed to link advertisements to the content being viewed by the client, a third ad 1203 will be delivered 1207 to the functional host, and then onward 1208 to the client. Once the client session ends 1201, the advertising and compensation system deactivates until the client is ready to log on again.

Assuming a sponsor host has been downloaded during a session, and the client begins a session on the network, the functional host (and associated text), will visibly appear in the screen viewing area (e.g., "Welcome! This session is sponsored by Company X"). The functional host remains there throughout the session, or until a subsequent host (ad host or sponsor host) is served or downloaded by the client.

As advertising and/or promotional content is processed for the functional host, a variety of associated advertisement content will be served to the user's browser screen.

Furthermore depending on acceptance by the client, any number of different skins may be served over the functional host to signify advertisement content or information sent from a customized advertisement wheel. The functional host may communicate visually, audibly or through various combinations.

Thus if Company X is having a sale on portable computers, or is otherwise promoting a competitive or charitable sporting event, or is promoting a new line of products, or otherwise promoting the company itself, the advertising server site may trigger the functional host to convey any (or all) of this information.

The client may respond to the transmission by activating the host through one of the FAC control, and/or browsing control features described above (FIG. 3, 306), or by any other means available, depending on the technology used (i.e., PDA, cellular telephone). The advertisement or information transmitted to the client as a result would then be focused in a "Company X environment," thus effectively conveying desired content to the client via the functional host. Of course, the advertisements or information transmitted to the client may be affiliated with the session sponsor, or may be affiliated with numerous advertisers or promoters that are unrelated to the session sponsor. There is great latitude that is provided for the advertising administrator in implementing various methods of delivery under this invention.

There is also great latitude in the implementation of the ad hosts and sponsor hosts. For example, promotions may be set up to give discounts to clients who have collected a set number of hosts. Furthermore, each host may be associated with e-coupons or other transactional discounts and incentives which may be assigned a redemption value in that these coupon hosts may be bartered, exchanged or purchased through the system.

One novel implementation of the host system involves treating each host (i.e., e-coupon, e-discount certificate, etc.) as a measure of currency, with a predetermined redemption value. A client will be able to redeem coupon hosts for full face-value, or swap the redemption value of the coupon host, for those of another advertiser's coupon host. For example, one user receives a coupon host from an advertiser, allowing 10% off of any DVD player. The client however, already owns a DVD player, but saves the coupon host anyway. Later, the client finds another system member who has a coupon host from another advertiser for a new disk drive. Both the client and system member may exchange their coupon hosts to obtain a discount (worth the redemption value) off of the desired item. The coupon hosts may alternately be assigned an interest-bearing value, where, over a determined period of time, an "interest" which may take the form of additional discounts, frequent buyer program points, or other forms of transactional currency including cash, may be assigned. The coupon hosts may also be assigned a time value discount (e.g., host has $50 value, but, loses $5 value each day), in order to promote client consumption. The coupon host may also be used as a merchandise purchase right, wherein identified merchandise is communicated to the client as being available and ready for purchase at a certain time and/or at a certain price. Thus, clients may pay a retainer to the advertiser to be notified of a product that is going to be made available in the future. Alternately, a coupon host might have features as a merchandise sale right.

The foregoing is to be understood as being in every respect illustrative and exemplary, but not restrictive, and the scope of the invention disclosed herein is not to be determined from the Detailed Description, but rather from the claims as interpreted according to the full breadth permitted by law. It is to be understood that the embodiments shown and described herein are only illustrative of the principles of the present invention and that various modifications may be implemented without departing from the spirit and scope of the invention.

We claim:

1. A method comprising:
   a) determining a revenue pool comprised of an amount paid by a plurality of advertisers, sponsors and other revenue sources prior to receiving or considering client impressions related to content;
   b) transmitting over an electronic network a functional host with client control features to a client requesting content data;
   c) transmitting over an electronic network at least one content page from at least one content provider, along with the functional host, to the client;
   d) receiving client impressions related to the at least one content page through the functional host; and
   e) calculating content provider revenue that is comprised of the revenue pool divided by the total number of client impressions counted on the at least one content page from at least one content provider, wherein the revenue pool is not dependent on client impressions.

2. The method of claim 1, wherein the client control features include functions to print content.

3. The method of claim 1, wherein the client control features include functions to save content.

4. The method of claim 1, wherein the client control features include functions to remotely transmit content.

5. The method of claim 1, wherein the client control features include functions to search content.

6. The method of claim 1, wherein the client control features include functions to print, save, search, transmit content.

7. The method of claim 1, wherein the counting of an impression occurs each time the client is delivered at least one content page from at least one content provider, and other similar client activities.

8. The method of claim 1, wherein the counting of an impression occurs each time the client prints at least one content page from at least one content provider, and other similar client activities.

9. The method of claim 1, wherein the counting of an impression occurs each time the client saves at least one content page from at least one content provider, and other similar client activities.

10. The method of claim 1, wherein the counting of an impression occurs each time the client remotely transmits at least one content page from at least one content provider.

11. The method of claim 1, wherein the host is always visible to the client when active.

12. The method of claim 1, wherein advertising content is associated with the content page based on at least one of a client profile, preferences, content page and content location.

13. The method of claim 1, wherein advertising content is associated with the content page based on at least one of the content being accessed by the client.

14. The method of claim 1, wherein advertising content is associated with the content page based on at least one of the at least one content page from at least one content provider delivered to the client.

15. The method of claim 1, wherein revenue pool comprises the total number of advertisement spots, multiplied by the price per advertisement.

16. The method of claim 1, further comprising determining the value of designated client activity in the content provider's content.

17. A method comprising:
   a) determining a revenue pool comprised of an amount paid by a plurality of advertisers, sponsors and other revenue sources prior to receiving or considering client impressions related to content;
   b) transmitting over an electronic network content from a plurality of content providers to a client;
   c) receiving client impressions of the content distributed by the plurality of content providers; and
   d) distributing revenue from the revenue pool, wherein each content provider's share would be equal to the revenue pool divided by the total number of impressions received for all content providers and then multiplied by the total number of impressions received by each content provider, and the revenue pool is not dependent on client impressions.

18. The method of claim 17, wherein calculating revenue for the revenue pool is accomplished by multiplying the number of advertising spots by the price per advertisement.

19. The method of claim 17, wherein the counting of client impressions include actions where the client is delivered a content page from a content provider.

20. The method of claim 17, wherein the counting of client impressions include actions where the client prints a content page from a content provider.

21. The method of claim 17, wherein the counting of client impressions include actions where the client saves a content page from a content provider.

22. The method of claim 17, wherein the counting of client impressions include actions where the client transmits a content page from a content provider.

23. The method of claim 17, wherein the counting of client impressions include actions where the client initiates a search from content page from a content provider.

24. The method of claim 17, wherein the counting of client impressions include actions where the client: (1) is delivered a content page from a content provider, (2) prints a content page from a content provider, (3) saves a content page from a content provider, (4) transmits a content page from a content provider.

25. The method of claim 17, further comprising determining the value of designated client activity in the content provider's content.

26. A system for providing advertiser-sponsored content in a global content center comprising:
   a) means for determining a revenue pool comprised of an amount paid from a plurality of advertisers, sponsors and other revenue sources prior to receiving or considering client impressions related to content;
   b) means for associating advertisements with a client profile, preference, content page and content location in the global content center;
   c) means for serving associated advertisements to a client host;
   d) means for counting client impressions of content on the global content center; and
   e) means for distributing revenue from the revenue pool to content providers depending on the number of client impressions counted for each content provider, wherein the revenue pool is not dependent on client impressions.

27. The system of claim 26, wherein an impression is counted when a client: (1) is delivered a content page; (2) prints a content page; (3) saves a content page; (4) transmits a content page.

28. Computer executable software code stored on a computer readable medium, comprising:
   a) code to determine an advertiser-generated revenue pool comprised of an amount paid by a plurality of advertisers, sponsors and other revenue sources prior to receiving or considering client impressions related to content;
   b) code to determine the number of client impressions on a content provider's content;
   c) code to access the advertiser-generated revenue pool; and
   d) code to determine a value of compensation for the content provider by processing client impressions in relation to the advertiser-generated revenue pool, wherein the advertiser-generated revenue pool is not dependent on client impressions.

29. Computer executable software code stored on a computer readable medium as in claim 28, wherein further code is added to determine value of designated client activity in the content provider's content.

30. Computer executable software code stored on a computer readable medium, comprising:
   a) code to determine an advertiser-generated revenue pool comprised of an amount paid by a plurality of advertisers, sponsors and other revenue sources prior to receiving or considering client impressions related to content;
   b) code to associate advertisements with a functional host, content page, and to a known content provider topic;
   c) code to serve an associated advertisement;
   d) code to determine the number client impressions on a content provider's content; and
   e) code to determine a value of compensation for the content provider by processing client impressions in relation to the advertiser-generated revenue pool, wherein the advertiser-generated revenue pool is not dependent on client impressions.

31. A system comprising:
   a) a memory loaded with a web page;
   b) a revenue pool comprised of an amount paid by a plurality of advertisers, sponsors and other revenue sources determined prior to receiving or considering client impression related to content;
   c) a functional sponsor host, loaded in the web page and transmitted to a client; and
   d) an advertising wheel, disposed in communication with the functional sponsor host, wherein client impressions are transmitted from the functional sponsor host in relation to the web page, the client's impressions being used to determine content provider revenue from the revenue pool, wherein the revenue pool is not dependent on the client impressions.

32. The system of claim 31, wherein client impressions are transmitted each time the client: (1) views the web page; (2) prints the web page; (3) saves the web page; (4) initiates a search from the web page; (5) transmits the web page.

33. The system of claim 31, wherein the advertising wheel contains a secondary source of advertisements.

34. The system of claim 33, wherein the secondary source of advertisement is a secondary advertising wheel.

35. The system of claim 33, wherein the secondary source is a locality of the sponsor.

36. The system of claim 33, wherein the secondary source is a running special on the sponsor's product(s) or service(s).

37. The system of claim 33, wherein the secondary source is a price category of a sponsor's product(s) or service(s).

38. The system of claim 33, wherein the secondary source is newly released product(s) or service(s) by the sponsor.

39. The system of claim 33, wherein the secondary source is a sponsored community or charity event.

40. The system of claim 33, wherein the secondary source is financially-related news on the sponsor.

41. A method comprising:
a) determining a revenue pool formed from contributions paid by a plurality of advertisers, sponsors and other revenue sources prior to receiving or considering client impressions related to content;
b) transmitting over an electronic network a functional host to a client;
c) transmitting over the electronic network at least one content page from at least one content provider, along with the functional host, to the client; and
d) receiving client impressions related to the at least one content page through the functional host to determine content provider revenue based on the revenue pool, wherein the revenue pool is not dependent on client impressions.

42. The method of claim 41, wherein the total number of client impressions received by each content provider are divided by the total number of client impression received by all content providers and then multiplied by the amount of the revenue pool to establish periodic revenue for each content provider.

43. The method of claim 41, wherein transmitting the functional host further includes printing content.

44. The method of claim 41, wherein transmitting the functional host further includes saving content.

45. The method of claim 41, wherein transmitting the functional host further includes transmitting content.

46. The method of claim 41, wherein transmitting the functional host further includes initiating a search from the content.

47. The method of claim 41, wherein transmitting the functional host further includes printing, saving, transmitting, or initiating a search from the content.

48. A method comprising:
a) determining an amount of revenue paid by a plurality of advertisers, sponsors and other revenue sources prior to considering client impressions related to content;
b) determining a revenue pool based on the revenue paid, the revenue pool being determined prior receiving or considering client impressions related to content;
c) transmitting over an electronic network a functional host with client control features to a client requesting content data;
d) transmitting over an electronic network at least one content page from at least one content provider, along with the functional host, to the client;
e) receiving client impressions related to the at least one content page through the functional host; and
f) calculating content provider revenue that is comprised of the revenue pool divided by the total number of client impressions counted on the at least one content page from at least one content provider.

49. A method comprising:
a) determining an amount of revenue paid by a plurality of advertisers, sponsors and other revenue sources prior to considering client impressions related to content;
b) determining the revenue pool based on the revenue paid, the revenue pool being determined prior to receiving or considering client impressions related to content;
c) transmitting over an electronic network content from a plurality of content providers to a client;
d) receiving client impressions of the content distributed by the plurality of content providers; and
e) distributing revenue from the revenue pool, each content provider's share being equal to the revenue pool multiplied by the sum of the total number of impressions received for each content provider divided by the total number of impressions received for all content providers.

50. A system for providing advertiser-sponsored content in a global content center comprising:
a) means for determining a revenue pool comprised of an amount paid by a plurality of advertisers, sponsors and other revenue sources prior to receiving or considering client impressions related to content;
b) means for associating advertisements with a client profile, preference, content page and content location in the global content center;
c) means for serving associated advertisements to a client host;
d) means for counting client impressions of content on the global content center; and
e) means for distributing revenue from the revenue pool to content providers depending on the number of client impressions counted for each content provider, wherein the revenue pool is not dependent on client impressions.

51. Computer executable software code stored on a computer readable medium, comprising:
a) code to determine an advertiser-generated revenue pool comprised of an amount paid by a plurality of advertisers, sponsors or revenue sources prior to receiving or considering client impressions related to content;
b) code to determine the number client impressions received on a content provider's content;
c) code to access the advertiser-generated revenue pool of a plurality of advertisers, sponsors and revenue sources; and
d) code to determine a value of compensation for the content provider by processing client impressions in relation to the advertiser-generated revenue pool, wherein the revenue pool is not dependent on client impressions.

52. Computer executable software code stored on a computer readable medium, comprising:
a) code to determine an advertiser-generated revenue pool comprised of an amount paid by a plurality of advertisers, sponsors and other revenue sources prior to receiving or considering client impressions related to content;
b) code to associate advertisements with a functional host, content page, and to a known content provider topic;
c) code to serve an associated advertisement;
d) code to determine the number client impressions received on a content provider's content, and
e) code to determine a value of compensation for the content provider by processing client impressions in relation to an advertiser-generated revenue pool, wherein the revenue pool is not dependent on client impressions.

53. A system comprising:
 a) a means for determining a revenue pool comprised of an amount paid by a plurality of advertisers, sponsors and other revenue sources prior to receiving or considering client impressions related to content;
 b) a memory loaded with a web page;
 c) a functional sponsor host, loaded in the web page; and
 d) an advertising wheel, disposed in communication with the functional sponsor host that determines and transmits a plurality of client impressions from the functional sponsor host in relation to the web page to determine content provider revenue from the revenue pool, wherein the revenue pool is not dependent on the client impressions.

54. A method comprising:
 a) determining a revenue pool formed from an amount paid by contributions from a plurality of advertisers, sponsors and other revenue sources prior to receiving or considering client impressions related to content;
 b) transmitting over an electronic network a functional host to a client;
 c) transmitting over an electronic network at least one content page from at least one content provider, along with the functional host, to the client; and
 d) receiving client impressions related to the at least one content page through the functional host to determine content provider revenue based on the revenue pool, wherein the revenue pool is not dependent on client impressions.

* * * * *

UNITED STATES PATENT AND TRADEMARK OFFICE
CERTIFICATE OF CORRECTION

PATENT NO. : 6,976,003 B1 Page 1 of 1
DATED : December 13, 2005
INVENTOR(S) : Alan Hamor and Michael Helton It is certified that error appears in the above-identified patent and that said Letters Patent is hereby corrected as shown below:

Column 1,
Line 34, delete "an" before "TCP/IP" and insert -- a --.

Column 3,
Line 28, after "illustrates" delete "the".
Line 44, after "session" insert -- . --.

Column 6,
Lines 19-20, after "to the" delete "clienthost," and insert -- client host, --.

Column 8,
Line 38, delete "purchasedby" and insert -- purchased by --.
Line 55, after "performed" insert -- : --.

Column 13,
Lines 15-20, delete "Thus if Company X is having……………this information." and insert on line 14.

Column 14,
Line 25, after "over" delete "an" and insert -- the --.

Column 17,
Line 61, after "over" delete "an" and insert -- the --.

Column 20,
Line 8, after "over" delete "an" and insert -- the --.

Signed and Sealed this

Twenty-eighth Day of March, 2006

JON W. DUDAS
*Director of the United States Patent and Trademark Office*